(12) United States Patent
Zillmann et al.

(10) Patent No.: US 9,172,574 B1
(45) Date of Patent: Oct. 27, 2015

(54) DYNAMIC-RANGE REDUCTION OF COMPLEX-VALUED BASEBAND SIGNALS

(71) Applicant: QUALCOMM Incorporated, San Diego, CA (US)

(72) Inventors: Peter Zillmann, Nuremberg (DE); Christoph Arnold Joetten, Wadern (DE); Christian Pietsch, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/329,563

(22) Filed: Jul. 11, 2014

(51) Int. Cl.
*H04K 1/02* (2006.01)
*H04L 27/26* (2006.01)
*H04L 27/36* (2006.01)

(52) U.S. Cl.
CPC ............ *H04L 27/2623* (2013.01); *H04L 27/36* (2013.01)

(58) Field of Classification Search
CPC ............ H04L 2025/0342; H04L 27/34; H04L 27/2602; H04L 27/2623; H04L 27/26; H04L 27/362; H04L 27/36; H04L 27/2626; H04L 27/2614; H04B 2201/70706; H03F 1/3241
USPC ......... 375/375, 261, 225, 260, 264, 297, 298; 332/103
See application file for complete search history.

(56) References Cited

U.S. PATENT DOCUMENTS

| | | |
|---|---|---|
| 7,839,951 B2 | 11/2010 | Cai et al. |
| 8,295,388 B1 | 10/2012 | Hinton et al. |
| 8,670,796 B2 | 3/2014 | Cimini, Jr. et al. |
| 8,699,590 B2 | 4/2014 | Yu et al. |
| 2012/0307925 A1* | 12/2012 | Huang et al. .................. 375/260 |

FOREIGN PATENT DOCUMENTS

| | | |
|---|---|---|
| CN | 101359945 B | 4/2012 |
| JP | 2009049651 A | 3/2009 |

OTHER PUBLICATIONS

Alter J.J., et al., "Radar Digital Signal Processing," in Radar Handbook (Merrill Skolnik ed.) ch. 25, pp. 25.1-25.39; available at http://jocoleman.info/pubs/papers/SkolnikCh25.pdf (downloaded from the internet Jul. 7, 2014).

Braithwaite, R. N., "Crest Factor Reduction for OFDM Using Selective Subcarrier Degradation", ZTE Communications, 2011, 13 pages, printed from website on Jun. 4, 2014. The full URL for the article is: http://wwwen.zte.com.cn/endata/magazine/ztecommunications/2011Year/no4/articles/201202/t20120202_283037.html.

Wong, K.T., et al., "OFDM PAPR reduction by switching null subcarriers and data-subcarriers", The Institution of Engineering and Technology 2011, Electronics Letters, vol. 47, No. 1, Jan. 6, 2011, 2 pages.

* cited by examiner

*Primary Examiner* — Rahel Guarino
(74) *Attorney, Agent, or Firm* — Mahamedi Paradice LLP

(57) ABSTRACT

To reduce the peak-to-average power ratio (PAPR) of a complex-valued digital baseband signal, the signal is mixed to an intermediate frequency and its real components extracted, to generate an intermediate-frequency real-valued digital signal. The intermediate frequency is one-quarter of a sampling rate of the complex-valued digital baseband signal. The intermediate-frequency real-valued digital signal is clipped and down-converted by one-quarter of the sampling rate.

20 Claims, 4 Drawing Sheets

US 9,172,574 B1

DYNAMIC-RANGE REDUCTION OF COMPLEX-VALUED BASEBAND SIGNALS

TECHNICAL FIELD

The present embodiments relate generally to digital communications, and specifically to reducing the dynamic range of baseband signals.

BACKGROUND OF RELATED ART

The peak-to-average power ratio (PAPR) of a signal is defined as the ratio of the signal's peak power to its average power. PAPR is the square of the crest factor, which is defined as the signal's peak amplitude divided by its average value (i.e., its root-mean-squared, or RMS, value). A high PAPR and corresponding high crest factor reduce power-amplifier (PA) efficiency and increase the dynamic range for transmit-signal-processing stages, thus complicating the design of those stages. Dynamic range refers to the ratio of the maximum signal magnitude to the minimum signal magnitude. High PAPR is a known challenge in orthogonal frequency-division multiplexing (OFDM).

Accordingly, it is desirable to reduce the PAPR of digital baseband transmit signals, such as digital baseband OFDM transmit signals. The PAPR may be reduced by reducing the dynamic range.

One approach to dynamic range reduction, and thus to PAPR reduction, is clipping and filtering. FIG. 1 is a block diagram of PAPR reduction circuitry 100 that clips and filters a digital baseband signal provided as input. The digital baseband signal is a quadrature-amplitude-modulation (QAM) baseband signal with in-phase ($I_{in}$) and quadrature ($Q_{in}$) components. This input signal is provided to an absolute-value module 102 and a multiplier 106. The absolute-value module 102 determines the magnitude |in| of the input signal and provides the magnitude |in| to a lookup table (LUT) 104. A clipping level A is also provided to the LUT 104. The LUT 104 uses the magnitude |in| and the clipping level A to perform a lookup that returns a clipping factor c. The clipping factor c may be determined using the formula:

$$c = \begin{cases} 1, & |in| \leq A \\ A/|in|, & |in| > A \end{cases} \quad (1)$$

The multiplier 106 multiplies the input signal by the clipping factor c, thereby clipping the input signal. A low-pass filter (LPF) 108 filters the clipped input signal, resulting in an output signal of the PAPR reduction circuitry 100. The output signal is a QAM baseband signal with in-phase ($I_{out}$) and quadrature ($Q_{out}$) components.

The clipping-and-filtering technique performed by the PAPR reduction circuitry 100 involves a large number of multiplications, because the QAM baseband signal is complex-valued. Accordingly, there is a need for clipping-and-filtering techniques that are computationally simple.

SUMMARY

In some embodiments, a method of reducing the PAPR of a signal includes mixing a first complex-valued digital baseband signal to an intermediate frequency and extracting real components to generate an intermediate-frequency real-valued digital signal. The intermediate frequency is one-quarter of a sampling rate of the first complex-valued digital baseband signal. The intermediate-frequency real-valued digital signal is clipped to generate a clipped intermediate-frequency digital signal, which is down-converted by one-quarter of the sampling rate.

In some embodiments, circuitry for reducing the peak-to-average power ratio (PAPR) of a signal includes a circuit to mix a first complex-valued digital baseband signal to an intermediate frequency and extract real components to generate an intermediate-frequency real-valued digital signal. The intermediate frequency is one-quarter of a sampling rate of the first complex-valued digital baseband signal. The circuitry also includes a multiplier to clip the intermediate-frequency real-valued digital signal, to generate a clipped intermediate-frequency digital signal. The circuitry further includes a down-converter to down-convert the clipped intermediate-frequency digital signal by one-quarter of the sampling rate.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1:
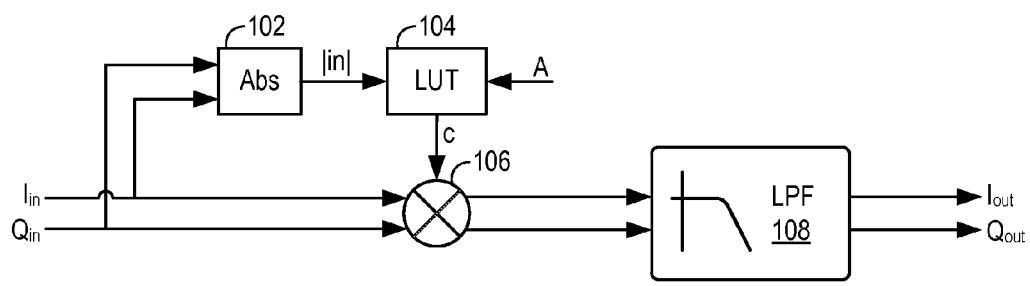
FIG. 1 is a block diagram of PAPR reduction circuitry that clips and filters a digital baseband signal.

The number of multiplications involved in reducing the dynamic range and PAPR of a signal may be reduced with respect to the clipping-and-filtering technique of FIG. 1 by avoiding clipping complex-valued signals.

Figure 2:
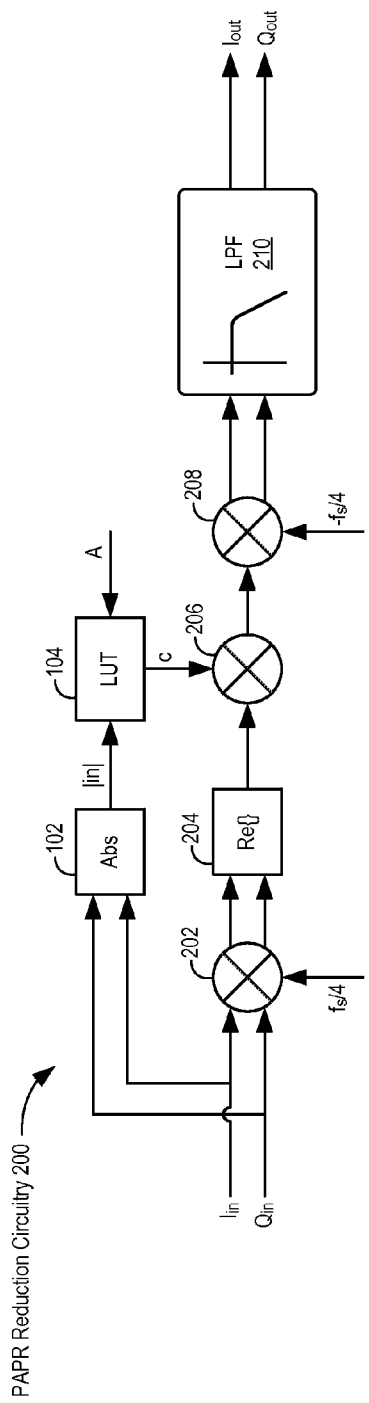
FIGS. 2 and 3 are block diagrams of PAPR reduction circuitry in accordance with some embodiments.

FIG. 2 is a block diagram of PAPR reduction circuitry 200 in accordance with some embodiments. The PAPR reduction circuitry 200 is described with reference to FIG. 4, which is a flowchart showing a method 400 of reducing the PAPR (and dynamic range) of a transmit signal in accordance with some embodiments. The PAPR reduction circuitry 200 is implemented in a transmitter, such that the transmitter performs the method 400.

A first complex-valued digital baseband signal is provided (402) as an input to the PAPR reduction circuitry 200. For example, the first complex-valued digital baseband signal is a first QAM baseband signal with in-phase ($I_{in}$) and quadrature ($Q_{in}$) components. This signal is provided to a mixer 202, which mixes (404) the first complex-valued digital baseband signal to an intermediate frequency that is one-quarter of a sampling rate (i.e., $f_s/4$) of the first complex-valued digital baseband signal. The mixer 202 thus up-converts the first complex-valued digital baseband signal to the intermediate frequency of one-quarter of the sampling rate, thereby changing the center frequency of the signal but not its sampling rate. A real-component-extraction module 204 receives the output of the mixer 202 and extracts (406) its real components, thus generating an intermediate-frequency real-valued digital signal.

The first complex-valued digital baseband signal is also provided to an absolute-value module 102, which determines (408) the signal's magnitude, denoted as link. The absolute-value module 102 provides the magnitude |in| to a LUT 104, which also receives a specified clipping level A. (Alternatively, the absolute-value module 102 determines another metric that corresponds to the signal's magnitude. For example, the absolute-value module 102 may determine the square of the signal's magnitude, $|in|^2$.) The LUT 104 determines (410) a clipping factor c using the magnitude |in| and the clipping level A (e.g., in accordance with equation 1), by performing (412) a lookup based on the values of |in| and A. Performing a lookup in a LUT 104 is merely one way of determined the clipping factor c (e.g., of performing the calculation of equation 1); others are possible.

A multiplier 206 clips (414) the intermediate-frequency real-valued digital signal by multiplying the intermediate-frequency real-valued digital signal by the clipping factor c. A mixer 208 down-converts (416) the clipped intermediate-frequency real-valued digital signal by one-quarter of the sampling rate (i.e., $f_s/4$) to generate a second complex-valued digital baseband signal. A low-pass filter (LPF) 210 filters (418) the second complex-valued digital baseband signal. The output of the LPF filter 210, and thus of the PAPR reduction circuitry 200, may be a QAM baseband signal with in-phase ($I_{out}$) and quadrature ($Q_{out}$) components. The LPF filter 210 functions by analogy to the LPF 108, although it may have a different number of taps (e.g., more taps) than the LPF 108.

In some embodiments, the functionality of the mixer 202, real-component-extraction module 204, and mixer 208 are achieved through sample selection. The functionality of these components thus may be achieved without performing multiplication.

Figure 3:
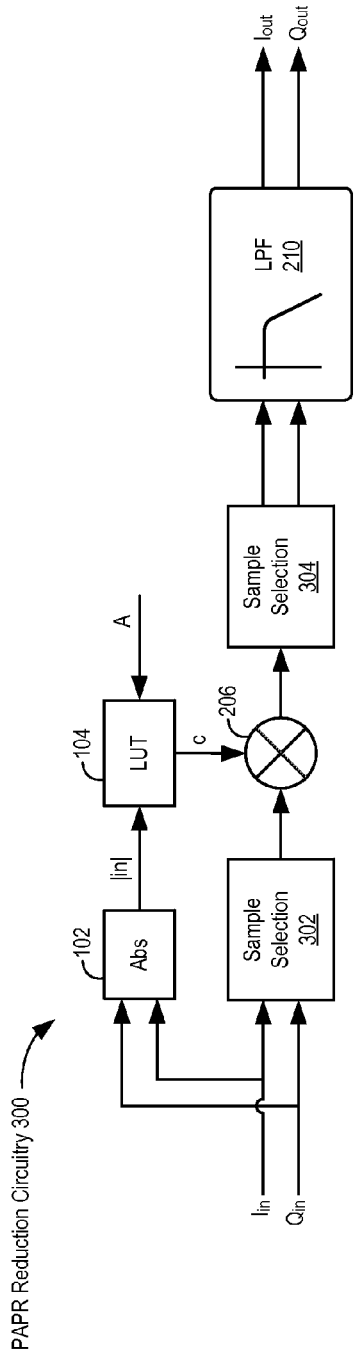
Figure 4:
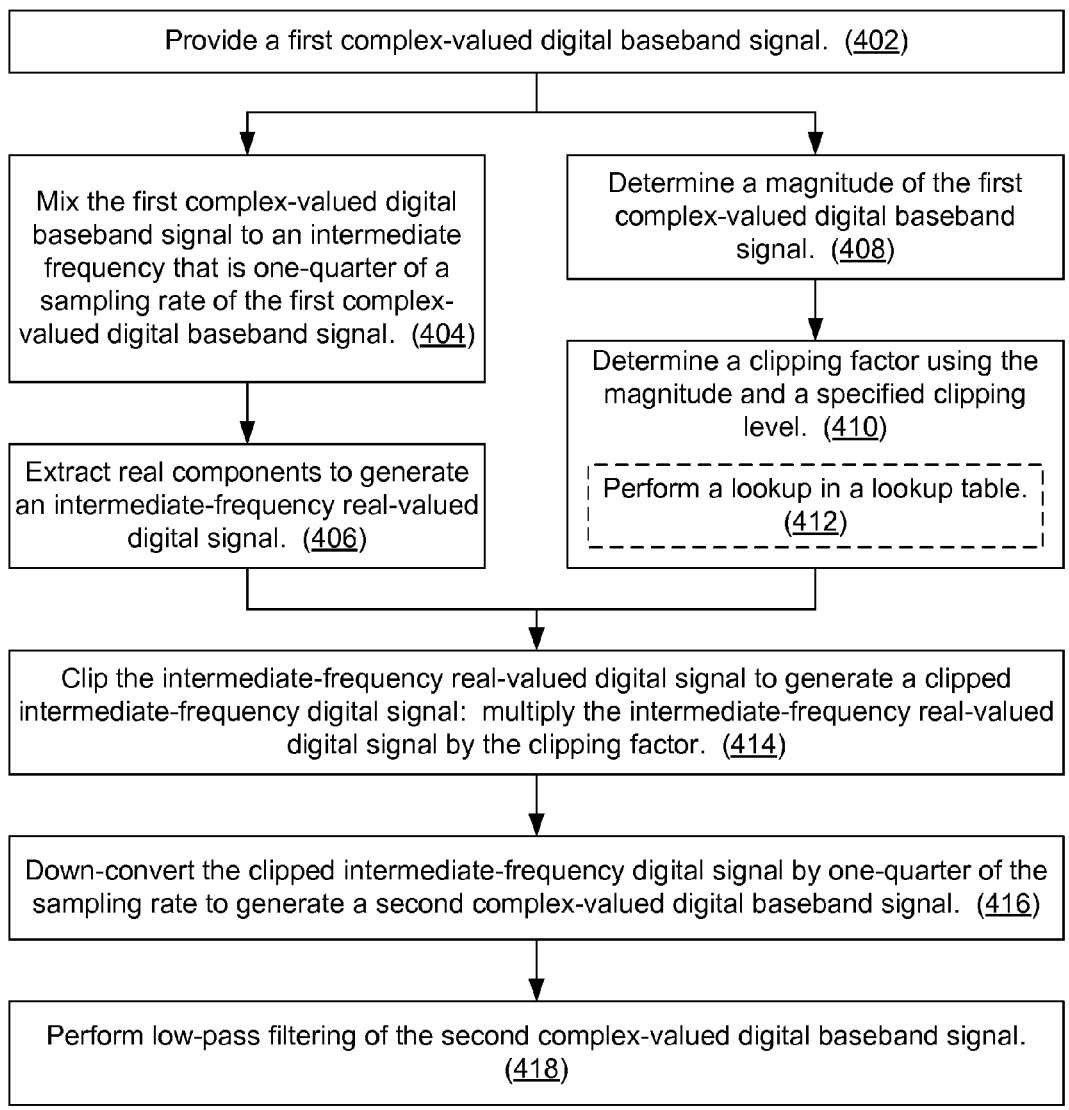
FIGS. 4 and 5 are flowcharts showing methods of reducing the PAPR of a transmit signal in accordance with some embodiments.
Figure 5:
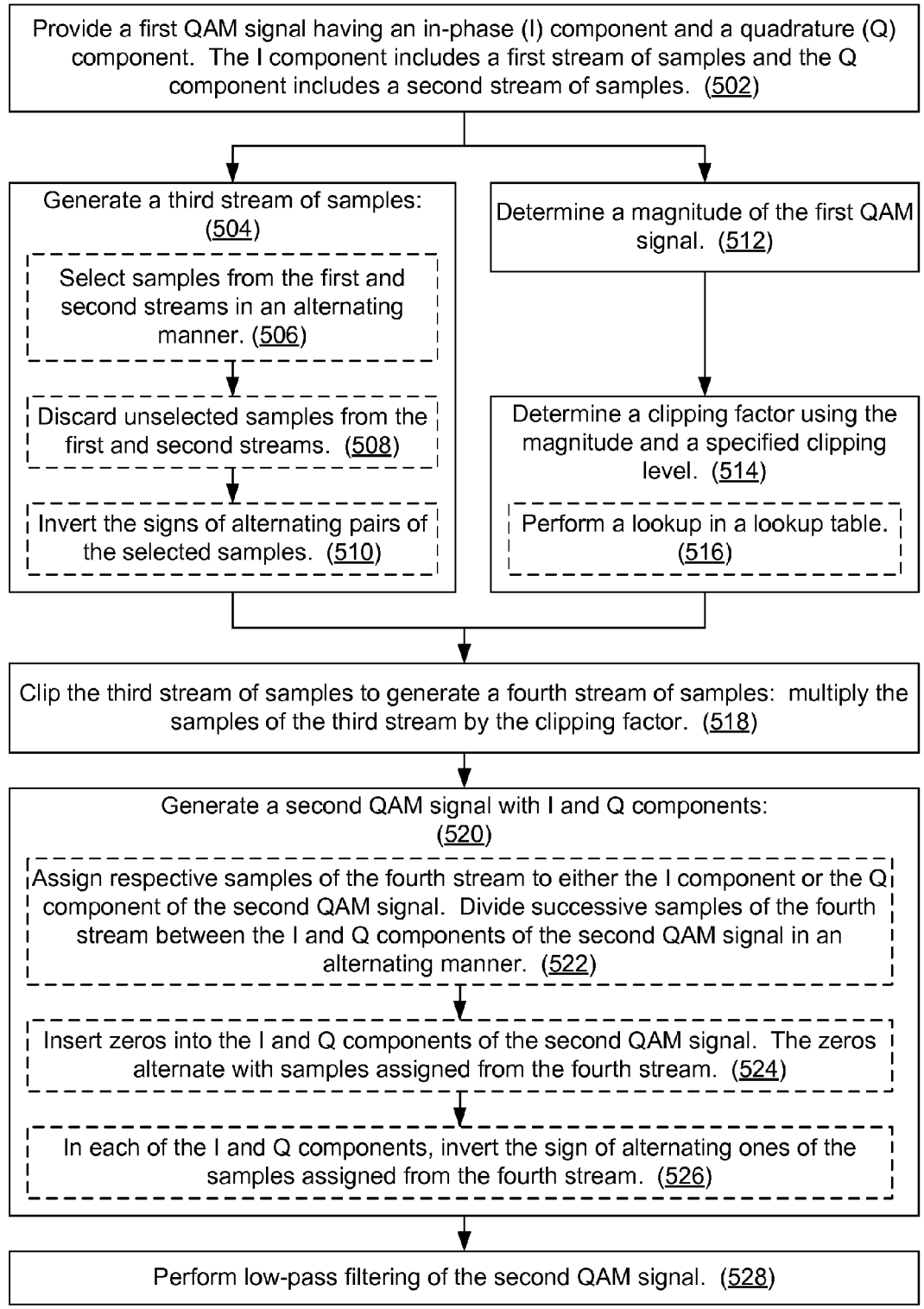

FIG. 3 is a block diagram of PAPR reduction circuitry 300, which is an example of the PAPR reduction circuitry 200 (FIG. 2), in accordance with some embodiments. The PAPR reduction circuitry 300 achieves the functionality of the mixer 202 and real-component-extraction module 204 using a first sample-selection module 302 and achieves the functionality of the mixer 208 using a second sample-selection module 304. The PAPR reduction circuitry 300 is described with reference to FIG. 5, which is a flowchart showing a method 500 of reducing the PAPR (and dynamic range) of a transmit signal in accordance with some embodiments. The method 500 is an example of the method 400 (FIG. 4). The PAPR reduction circuitry 300 is implemented in a transmitter, such that the transmitter performs the method 500.

A first QAM signal with in-phase ($I_{in}$) and quadrature ($Q_{in}$) components is provided (502) as an input to the PAPR reduction circuitry 300. The first QAM signal is an example of the first complex-valued digital baseband signal of the method 400 (FIG. 4). The $I_{in}$ component includes a first stream of samples:

$x_I[0], x_I[1], x_I[2], \ldots$ and the $Q_{in}$ component includes a second stream of samples:

$x_Q[0], x_Q[1], x_Q[2], \ldots$ where the bracketed numbers index the samples in each stream and thus indicate the temporal ordering of the samples in each stream.

The first sample-selection module 302 generates (504) a third stream of samples:

$x_I[0], -x_Q[1], -x_I[2], x_Q[3], x_I[4], \ldots$

To generate the third stream of samples, the first sample-selection module 302 thus selects (506) samples from the first and second streams in an alternating manner: $x_I[0]$ is selected, followed by $x_Q[1]$, followed by $x_I[2]$, followed by $x_Q[3]$, followed by $x_I[4]$, and so on. Unselected samples from the first and second streams are discarded (508) and thus not included in the third stream: $x_Q[0]$ is discarded, as are $x_I[1]$, $x_Q[2]$, $x_I[3]$, $x_Q[4]$, and so on. The signs of alternating pairs of the selected samples are inverted (510): the signs of $x_Q[1]$ and $x_I[2]$ are inverted (i.e., multiplied by −1), while the signs of $x_Q[3]$ and $x_I[4]$ are not inverted.

The third stream of samples is an example of the intermediate-frequency real-valued digital signal of the method 400 (FIG. 4). Generating the third stream of samples is an example of mixing (404, FIG. 4) the first complex-valued digital baseband signal and extracting (406, FIG. 4) its real components.

The absolute-value module 102 determines (512) the magnitude |in| of the first QAM signal. The LUT 104 determines (514) the clipping factor c based on the magnitude |in| and the clipping level A (e.g., using equation 1).

The multiplier 206 clips (518) the third stream of samples by multiplying the samples of the third stream by the clipping factor c. The multiplier 206 thus generates a fourth stream of samples, which is an example of the clipped intermediate-frequency real-valued digital signal of the method 400 (FIG. 4). The fourth stream of samples may be represented as:

$z[0], z[1], z[2], \ldots$

The second sample-selection module 304 generates a second QAM signal with I and Q components, each of which includes a respective stream of samples. The stream of samples for the I component of the second QAM signal is:

$y_I[0]=z[0], y_I[1]=0, y_I[2]=-z[2], y_I[3]=0, y_I[0]=z[4], \ldots$ while the stream of samples for the Q component of the second QAM signal is:

$y_Q[0]=0, y_Q[1]=-z[1], y_Q[2]=0, y_Q[3]=z[3], y_Q[4]=0, \ldots$

To generate the second QAM signal, the second sample-selection module 304 thus assigns (522) respective samples of the fourth stream to either the I component or the Q component of the second QAM signal, such that successive samples of the fourth stream are divided between the I and Q components of the second QAM signal in an alternating manner. For example, z[0] is assigned to the I component, z[1] is assigned to the Q component, z[2] is assigned to the I component, z[3] is assigned to the Q component, z[4] is assigned to the I component, and so on. The second sample-selection module 304 inserts (524) zeros into the I and Q components, such that the zeros alternate with the samples assigned from the fourth stream, as shown above. The second sample-selection module 304 also inverts (526) the sign of alternating ones of the samples assigned from the fourth stream in each of the I and Q components. For example, the sign of z[2] is inverted (i.e., multiplied by −1) in the I component, while the signs of z[0] and z[4] are not. In the Q component, the sign of z[1] is inverted while the sign of z[3] is not, as shown above.

The LPF 210 filters (528) the second QAM signal. The output of the LPF filter 210, and thus of the PAPR reduction circuitry 300, is a QAM baseband signal with in-phase ($I_{out}$) and quadrature ($Q_{out}$) components.

The PAPR reduction circuitry 300 and method 500 reduce the dynamic range of transmit signals, and thus reduce PAPR and the crest factor, in a computationally simple manner. The sample selection modules 302 and 304 function without performing any arithmetic operations. The multiplicative clipping performed by the multiplier 206 operates on a real-valued signal as opposed to a complex-valued signal, thereby reducing the number of multiplications as compared to the PAPR reduction circuitry 100 (FIG. 1). Also, half of the samples of the second QAM signal are zeros, which simplifies the filtering performed by the LPF 210.

While the methods 400 and 500 include a number of operations that appear to occur in a specific order, it should be apparent that the methods 400 and 500 can include more or fewer operations. Operations can be executed serially or in parallel, performance of two or more operations may overlap, and two or more operations may be combined into a single operation. For example, all of the operations of the methods 400 and/or 500 may be performed in parallel in an on-going manner as a transmit signal is processed.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of reducing a peak-to-average power ratio (PAPR) of a signal, the method comprising:
    mixing a first complex-valued digital baseband signal to an intermediate frequency and extracting real components to generate an intermediate-frequency real-valued digital signal, wherein the intermediate frequency is one-quarter of a sampling rate of the first complex-valued digital baseband signal;
    clipping the intermediate-frequency real-valued digital signal, to generate a clipped intermediate-frequency digital signal; and
    down-converting the clipped intermediate-frequency digital signal by one-quarter of the sampling rate.

2. The method of claim 1, wherein the first complex-valued digital baseband signal comprises a first quadrature-amplitude-modulation (QAM) signal having an in-phase (I) component and a quadrature (Q) component.

3. The method of claim 2, wherein:
    the I component of the first QAM signal comprises a first stream of samples;
    the Q component of the first QAM signal comprises a second stream of samples;
    the mixing and extracting comprise generating a third stream of samples as the intermediate-frequency real-valued digital signal, wherein generating the third stream of samples comprises:
        selecting samples from the first stream and the second stream in an alternating manner;
        discarding unselected samples from the first stream and the second stream; and
        inverting a signs of each alternating pairs of the selected samples.

4. The method of claim 3, further comprising determining a magnitude of the first QAM signal, wherein the clipping comprises:
    determining a clipping factor using the magnitude and a specified clipping level; and
    multiplying the samples of the third stream by the clipping factor to generate the clipped intermediate-frequency digital signal, wherein the clipped intermediate-frequency digital signal comprises a fourth stream of samples.

5. The method of claim 4, wherein determining the clipping factor comprises:
    setting the clipping factor to one when the magnitude is less than or equal to the clipping level; and
    setting the clipping factor to equal the clipping level divided by the magnitude when the magnitude exceeds the clipping level.

6. The method of claim 4, wherein determining the clipping factor comprises performing a lookup in a lookup table in accordance with the magnitude and the clipping level.

7. The method of claim 4, wherein the down-converting comprises generating a second QAM signal having I and Q components, wherein generating the second QAM signal comprises:
    assigning respective samples of the fourth stream to either the I component of the second QAM signal or the Q component of the second QAM signal, wherein successive samples of the fourth stream are divided between the I and Q components of the second QAM signal in an alternating manner;
    inserting zeros into the I and Q components of the second QAM signal, wherein the zeros alternate with samples assigned from the fourth stream; and
    in each of the I and Q components, inverting a sign of alternating ones of the samples assigned from the fourth stream.

8. The method of claim 7, further comprising performing low-pass filtering of the second QAM signal.

9. The method of claim 1, further comprising determining a magnitude of the first complex-valued digital baseband signal, wherein the clipping comprises:
    determining a clipping factor using the magnitude and a specified clipping level; and
    multiplying the intermediate-frequency real-valued digital signal by the clipping factor.

10. The method of claim 9, wherein determining the clipping factor comprises:
    setting the clipping factor to one when the magnitude is less than or equal to the clipping level; and
    setting the clipping factor to equal the clipping level divided by the magnitude when the magnitude exceeds the clipping level.

11. The method of claim 9, wherein determining the clipping factor comprises performing a lookup in a lookup table in accordance with the magnitude and the clipping level.

12. The method of claim 1, wherein:
    down-converting the clipped intermediate-frequency digital signal generates a second complex-valued digital baseband signal; and
    the method further comprises performing low-pass filtering of the second complex-valued digital baseband signal.

13. Circuitry for reducing a peak-to-average power ratio (PAPR) of a signal, the circuitry comprising:
- a circuit to mix a first complex-valued digital baseband signal to an intermediate frequency and extract real components to generate an intermediate-frequency real-valued digital signal, wherein the intermediate frequency is one-quarter of a sampling rate of the first complex-valued digital baseband signal;
- a multiplier to clip the intermediate-frequency real-valued digital signal, to generate a clipped intermediate-frequency digital signal; and
- a down-converter to down-convert the clipped intermediate-frequency digital signal by one-quarter of the sampling rate.

14. The circuitry of claim 13, wherein:
- the first complex-valued digital baseband signal comprises a first quadrature-amplitude-modulation (QAM) signal having an in-phase (I) component and a quadrature (Q) component, the I component of the first QAM signal comprising a first stream of samples, the Q component of the first QAM signal comprising a second stream of samples;
- the intermediate-frequency real-valued digital signal comprises a third stream of samples; and
- the circuit to mix the first complex-valued digital baseband signal to the intermediate frequency and extract the real components comprises a first sample-selection circuit to:
  - select samples from the first stream and the second stream in an alternating manner for inclusion in the third stream of samples;
  - invert a sign of each alternating pairs of the selected samples in the third stream of samples; and
  - discard unselected samples from the first stream and the second stream.

15. The circuitry of claim 14, further comprising:
- a circuit to determine a magnitude of the first complex-valued digital baseband signal; and
- a circuit to determine a clipping factor using the magnitude and a specified clipping level;
- wherein the multiplier is to multiply the samples of the third stream by the clipping factor to generate a fourth stream of samples.

16. The circuitry of claim 15, wherein the circuit to determine the clipping factor is to set the clipping factor to one when the magnitude is less than or equal to the clipping level and set the clipping factor to equal the clipping level divided by the magnitude when the magnitude exceeds the clipping level.

17. The circuitry of claim 15, wherein the circuit to determine the clipping factor comprises a lookup table.

18. The circuitry of claim 15, wherein the down-converter is to generate a second QAM signal comprising I and Q components, the down-converter comprising a second sample-selection circuit to:
- divide successive samples of the fourth stream between the I and Q components of the second QAM signal in an alternating manner, and thereby assign respective samples of the fourth stream to either the I component of the second QAM signal or the Q component of the second QAM signal;
- insert zeros into the I and Q components of the second QAM signal, wherein the zeros alternate with samples assigned from the fourth stream; and
- invert, in each of the I and Q components, a sign of alternating ones of the samples assigned from the fourth stream.

19. The circuitry of claim 18, further comprising a low-pass filter to filter the second QAM signal.

20. Circuitry for reducing a peak-to-average power ratio (PAPR) of a signal, the circuit comprising:
- means for mixing a first complex-valued digital baseband signal to an intermediate frequency and extracting real components to generate an intermediate-frequency real-valued digital signal, wherein the intermediate frequency is one-quarter of a sampling rate of the first complex-valued digital baseband signal;
- means for clipping the intermediate-frequency real-valued digital signal, to generate a clipped intermediate-frequency digital signal; and
- means for down-converting the clipped intermediate-frequency digital signal by one-quarter of the sampling rate, to generate a second complex-valued digital baseband signal; and
- means for filtering the second complex-valued digital baseband signal.

* * * * *